United States Patent [19]
Pilolla

[11] Patent Number: 5,358,213
[45] Date of Patent: Oct. 25, 1994

[54] FAUCET HAVING AUTOMATIC AND MANUAL CONTROL CAPABILITY

[76] Inventor: Joseph J. Pilolla, 853 Cedar Ave., Elmhurst, Ill. 60126

[21] Appl. No.: 40,835

[22] Filed: Mar. 31, 1993

[51] Int. Cl.⁵ ................ F16K 11/078; F16K 31/11
[52] U.S. Cl. .................. 251/129.03; 137/625.17; 251/129.04
[58] Field of Search .......... 251/129.03, 129.04; 137/636.4, 607, 625.17

[56] References Cited

U.S. PATENT DOCUMENTS

| | | | |
|---|---|---|---|
| 2,623,545 | 12/1952 | Traynor | 251/129.03 |
| 2,768,790 | 10/1956 | Frey | 251/129.03 X |
| 4,141,383 | 2/1979 | Geimer | 251/129.03 X |
| 4,330,011 | 5/1982 | Moen | 137/625.17 |
| 4,681,141 | 7/1987 | Wang | 251/129.03 X |
| 4,688,277 | 8/1987 | Kakinoki et al. | 4/623 |
| 4,709,728 | 12/1987 | Ying-Chung | 137/636.4 |
| 4,889,315 | 12/1989 | Imanaga | 251/129.03 |
| 4,914,833 | 4/1990 | Pilolla | 34/44 |
| 4,962,790 | 10/1990 | Chou et al. | 137/607 |
| 5,050,641 | 9/1991 | Shwu-Fen | 137/607 |
| 5,092,560 | 3/1992 | Chen | 251/30.03 |

*Primary Examiner*—Stephen M. Hepperle
*Attorney, Agent, or Firm*—Dorn, McEachran, Jambor & Keating

[57] ABSTRACT

A water faucet for discharging water automatically or manually includes a body which supports a single flow control valve mechanism, a manual actuation mechanism operatively associated with the flow control valve mechanism to operate the flow control valve mechanism and an electrically operated automatic actuation mechanism operatively associated with the flow control valve mechanism to operate the flow control valve mechanism independently of the manual actuation mechanism.

22 Claims, 4 Drawing Sheets

FAUCET HAVING AUTOMATIC AND MANUAL CONTROL CAPABILITY

BACKGROUND OF THE INVENTION

This invention relates to water faucets and more particularly to an automatically operable faucet having manual capability. Arrangements of this general type are shown in U.S. Pat. Nos. 4,688,277, 4,962,790, 5,050,641 and 5,092,560. Previous faucets providing automatic and manual control capability have required complex valves or operating mechanisms including use of pilot valves, a separate selector for mode of actuation, and/or use of multiple and remotely located automatic actuators. These prior designs have proven expensive to produce, represent a complex installation, and in many instances are confusing or complicated to operate.

One drawback has been the cost of manufacture and installation. Such faucets often require separate components remote from the faucet or separate flow paths and valving for manual and automatic operation.

Dual mode faucets represent an inherent complexity of use. Generally it is necessary to select the mode of operation. Once set, it is necessary to manually change to the other mode.

The faucet of the present invention addresses these prior deficiencies.

SUMMARY OF THE INVENTION

The present invention provides a faucet which employs a single mixing and flow control valve directly operable electrically and manually without a separate mode selection mechanism. A single control valve mechanism is operable by both the manual and automatic actuation mechanisms. Automatic operation is independent of the manual actuation mechanism. The faucet incorporates a solenoid actuator on the faucet body coupled with a low cost commercially-available mixing and flow control valve mechanism which reduces complexity and cost of manufacture.

The faucet of the present invention provides automatic and manual flow control and comprises a body which supports a single flow control valve mechanism, manual actuation mechanism operatively associated with the flow control valve mechanism, to actuate the flow control valve mechanism, an electrically operated automatic actuation mechanism operatively associated with the flow control valve mechanism to operate the flow control valve mechanism independently of the manual actuation mechanism.

DETAILED DESCRIPTION OF THE PREFERRED EMBODIMENT

Figures 1, 3:
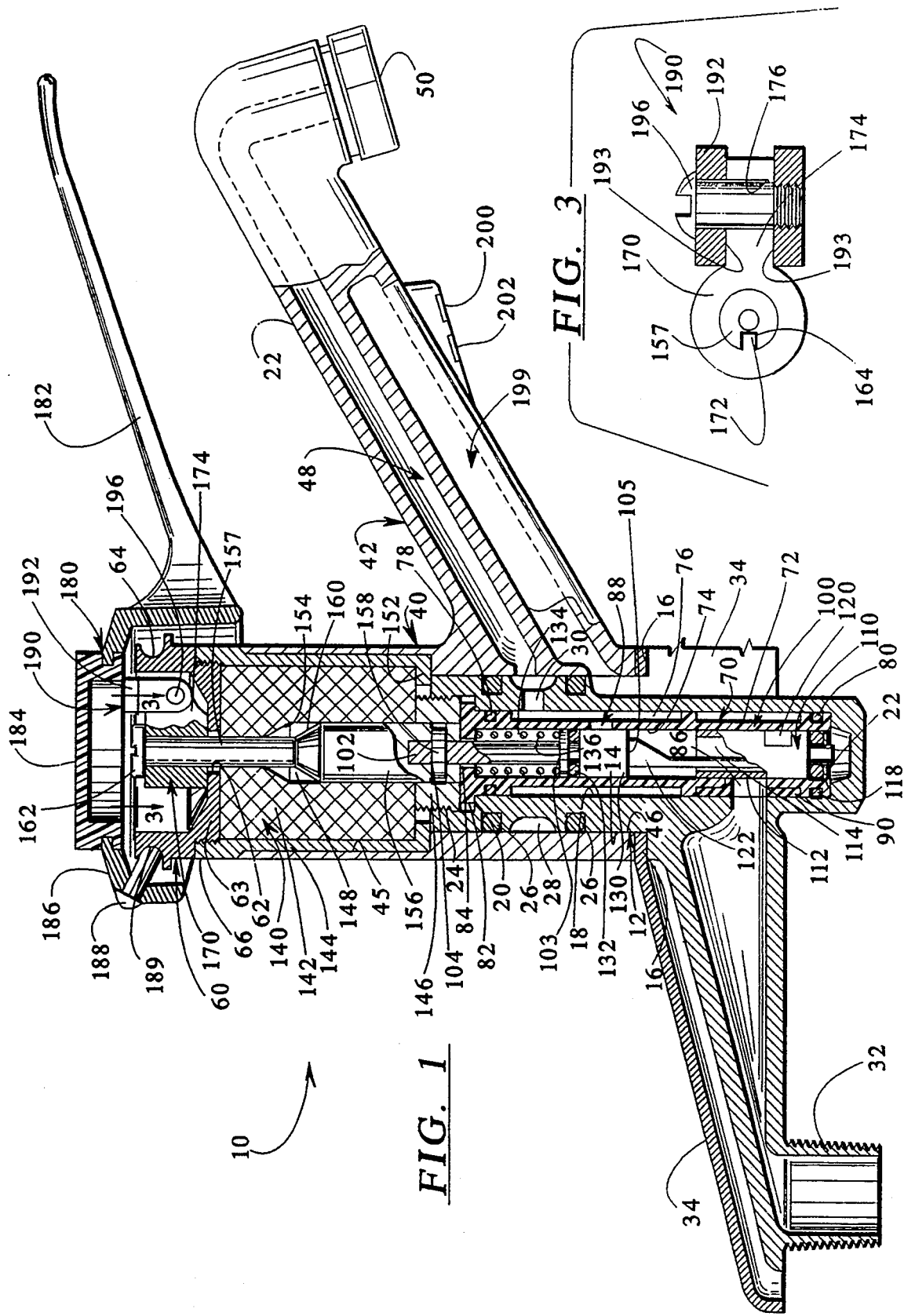
FIG. 1 is a rotated sectional view of a faucet in a closed position which embodies the present invention.
FIG. 3 is a partial sectional view of the structure of FIG. 1 showing particular features of the invention.

A faucet embodying the principles of the present invention is illustrated in FIGS. 1-4. Designated 10, the faucet body includes base or housing section 12, middle or spout section 40 and top section 60.

Base housing or section 12 is generally cylindrical. It includes an outer cylindrical surface 14 terminating in a shoulder 16 and has a central bore 18 extending between an upper annular shoulder 20 and bottom annular shoulder 22. The upper end of housing section 12 includes an enlarged threaded bore 24 above shoulder 20.

Outer cylindrical surface 14 includes spaced grooves in which are disposed elastomeric "O" ring seals 26. An annular relief or discharge channel 28 is provided between spaced "O" rings 26. A discharge passage 30 provides communication between central bore 18 and discharge channel 28.

Hot and cold water supply conduits permit attachment of hot and cold water supplies to housing section 12. One such inlet conduit is shown at 32. The other, not shown, is identical to inlet conduit 32 but is circumferentially displaced from the inlet illustrated.

A portion of the base section 12 is covered by a decorative shell 34 which conceals inlet conduits 32. It rests on shoulder 16.

Middle section 40 includes a cylindrical portion and outwardly extending spout 42. The cylindrical portion has a lower annular end which rests on an upper surface of shell 34 to retain it upon shoulder 16 of base section 12.

The upper end of middle section 40 is open and defines a cylindrical cavity 45. A central bore 46 of a slightly smaller diameter than the cylindrical cavity 45 joins cavity 45 and forms an annular shoulder. Central bore 46 extends through the remainder of middle section 40 and defines a surface which surrounds outer cylindrical surface 14 of base section 12 in sealing engagement with "O" rings 26.

Spout 42 extends outward of middle section 40. It defines a passage or conduit 48 in communication with channel 28. Conduit 48 leads to a discharge nozzle 50 from which water exits the faucet during operation. Middle section 40 also houses electronic components associated with automatic operation of the faucet. It should be understood, however, that the electronic sensing device, which accomplishes automatic operation of the faucet, may be remote from the body of the faucet.

Top section 60 is generally cylindrical in shape. A hole 62 is formed in bottom wall 63 to provide communication with central cavity 45 of middle section 40. A groove 64 of semi-circular cross-section is formed upon the outer periphery of top section 60. Threads 66 are formed around a lower portion of the outer periphery of top section 60 for attachment with middle section 40.

A flow control and mixing valve, or cartridge mechanism 70 is disposed within central bore 18 of base section 12. The cartridge envisioned for the present invention is of the "single lever" type. That is, a single operating lever actuates the valve and permits control of flow and water temperature. One commercially available valve cartridge is sold under the trademark "MOEN" by Stanadyne, Inc. of Cleveland, Ohio, a subsidiary of Standard Brands, Inc. Such a cartridge is illustrated in U.S. Pat. No. 4,330,011. Other similar cartridge valve mechanisms including, but not limited to, the cartridge illustrated in FIG. 5, may be used without departing from the principles of the present invention.

Cartridge mechanism 70 includes longitudinally elongated cylindrical sleeve 72 having an internal bore 74. Sleeve 72 is of reduced diameter compared to bore 18 of base section 12 and defines an annular passage 76 with bore 18. Portions of sleeve 72 adjacent its upper and lower ends are enlarged and mate with bore 18. Grooves house "O" ring seals 78 and 80 to provide a fluid tight seal between bore 18 and sleeve 72.

Sleeve 72 includes an upper flange 82 which rests on upper shoulder 20 of base section 12 within threaded bore 24. A hole or passage 84 is formed through the center of flange 82 to provide communication between bore 74 of sleeve 72 and threaded bore 24 of base section 12.

Sleeve 72 includes spaced inlet ports, each one of which is in communication with one of the hot and cold water inlet conduits. One such port 86 is shown in association with inlet conduit 32. The other is identical, but circumferentially displaced from the port illustrated. Similarly, one or more outlet ports 88 extend through sleeve 72 and provide communication between internal bore 74 and annular passage 76.

Resilient seal members associated with each inlet conduit 32 are retained between bore 18 and sleeve 72. One such seal member 90 is shown. Each seal member includes a central aperture which extends through sleeve 72 and defines an inlet port 86.

Positioned within bore 74 is longitudinally elongate generally cylindrical reciprocal and rotatable valve member 100. It includes inlet control piston portion 110 and outlet closure portion 130 connected by hollow tubular member 122.

A reduced diameter stem 102 extends upwardly from outlet closure portion 130. Stem 102 extends through hole 84 in upper flange 82 of sleeve 72 into cavity 45 of middle section 40 of faucet body 10. A transverse hole 104 is provided in stem 102 for connection of valve member 100 to automatic and manual actuation mechanisms.

Inlet control piston portion 110 and outlet closure portion 130 define cylindrical surfaces in closely fitting relation to bore 74 of sleeve 72. While this relation is essentially fluid tight, grooves at the upper and lower ends of valve member 100 receive "O" ring seals 118 and 132 to assure containment of the water under pressure within flow control valve mechanism or cartridge 70.

Cylindrical outlet closure portion 130 extends between upper annular seat 103 and a bottom edge 105 spaced from inlet control piston portion 110. A helical compression coil spring 136 is disposed between seat 103 and the undersurface of flange 82 of sleeve 72. Spring 136 biases axially movable valve member 100 toward the position illustrated in FIG. 1.

An upper portion of inlet control piston portion 110 includes wall 112 and defines a hollow internal annular cavity or chamber 114 within bore 74 of sleeve 72 surrounding hollow member 122. The axial extent of the cavity extends to edge 105 of outlet closure portion 130. A notch 120 is formed in the inlet control piston cylindrical wall which communicates with cavity 114.

Figure 2:
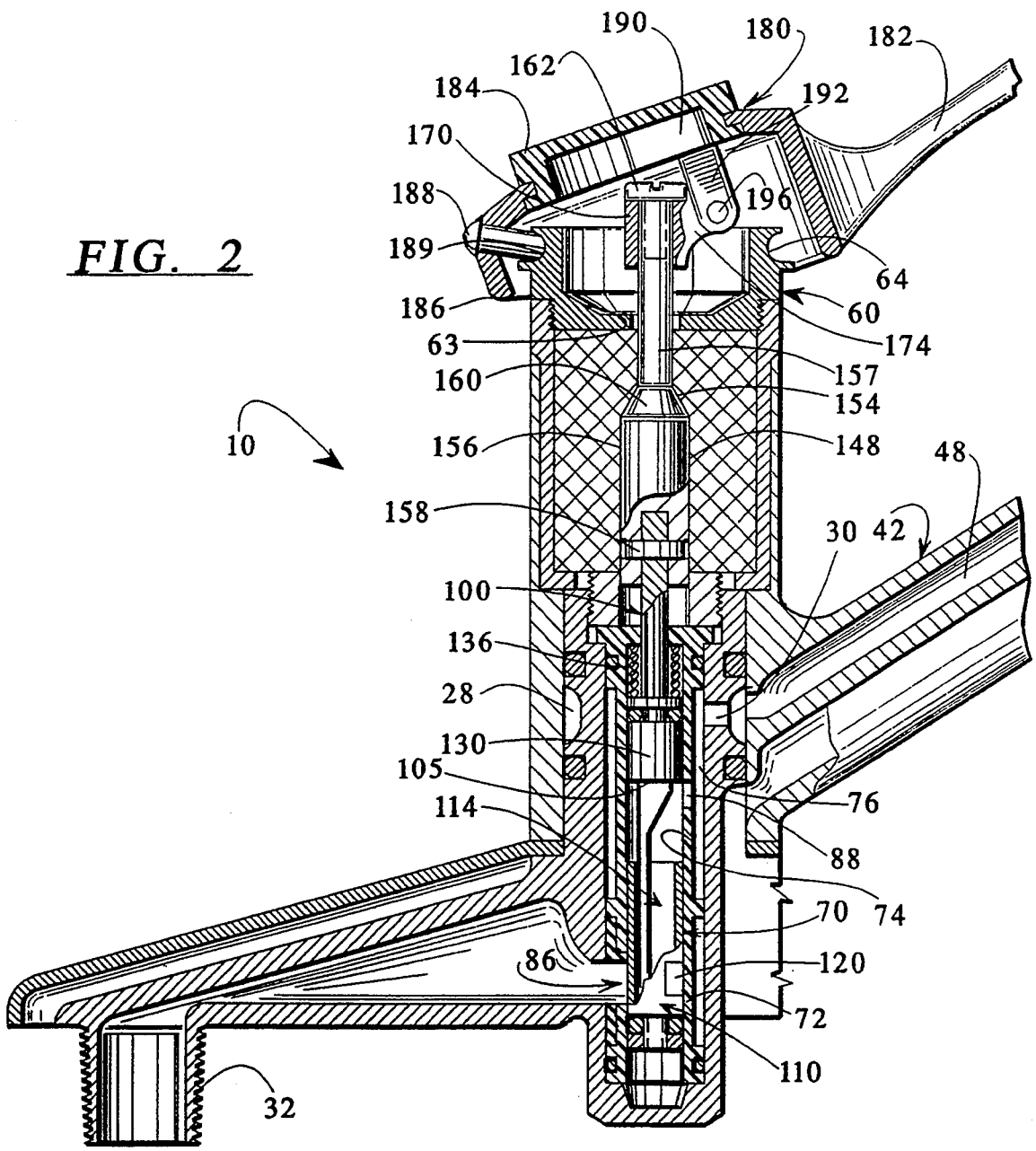
FIG. 2 is a rotated sectional view of a portion of the faucet illustrated in FIG. 1 in a manually actuated, open position.
Figure 4:
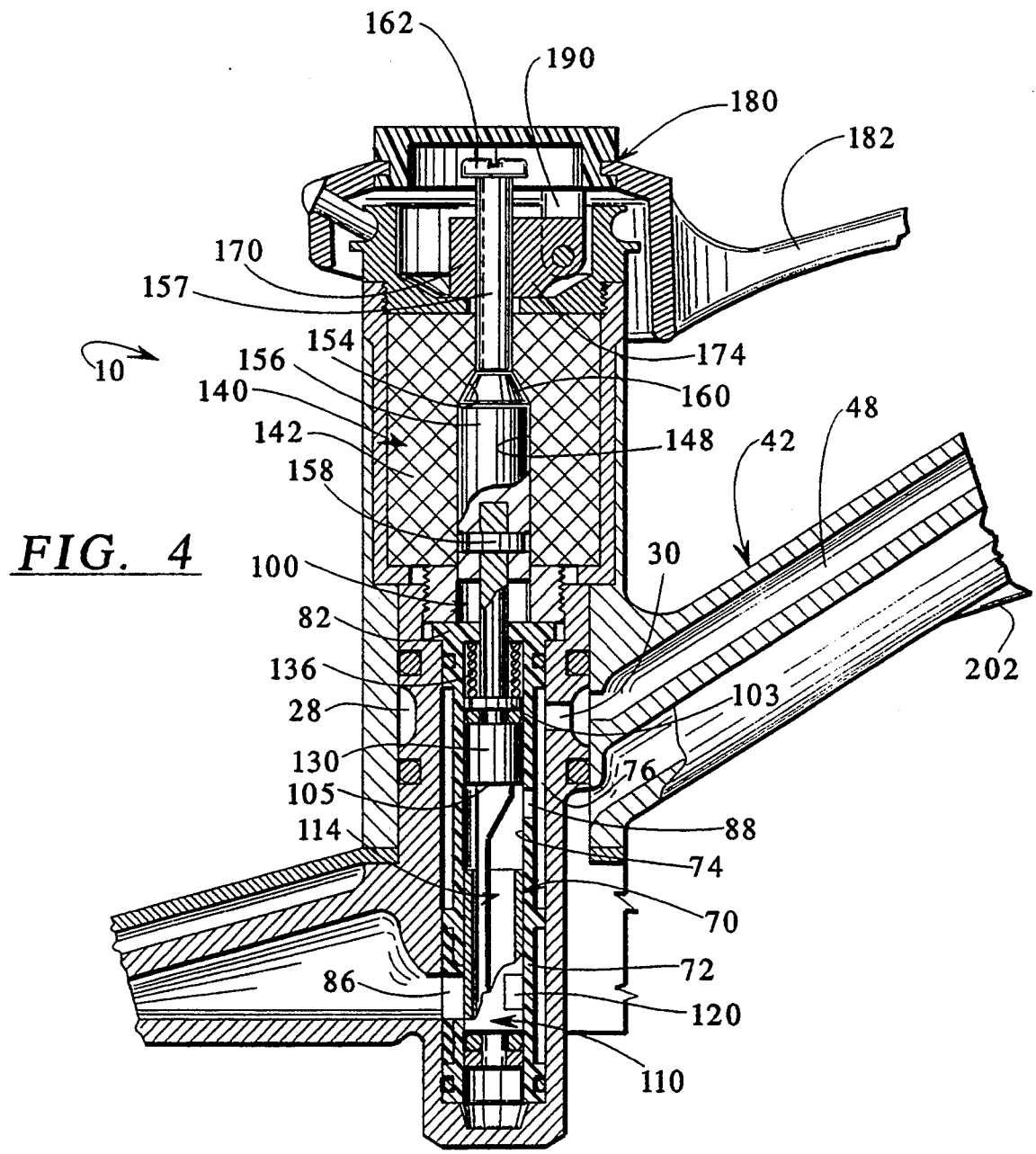
FIG. 4 is a sectional view of a portion of the faucet illustrated in FIG. 1 in an electrically actuated, open position.

Valve member 100 is axially movable between a closed position illustrated in FIG. 1 and an open position illustrated in FIGS. 2 and 4. In the closed position the notch 120 of inlet control piston portion 110 is disposed below fluid inlet ports 86. The edge 105 of outlet closure portion 130 is positioned below fluid outlet port 88. In this position the outer cylindrical surfaces of inlet control piston portion 110 and outlet closure portion 130 respectively close ports 86 and 88 and isolate or separate inlet ports 86 from outlet port 88. Water is prevented from entering bore 74 of sleeve 72 through the inlet ports 86. Communication of bore 74 with outlet port 88 is also blocked.

Upward axial movement of valve member 100 to the position illustrated in FIGS. 2 and 4 places notch 120 in communication with inlet ports 86 and raises edge 105 of outlet closure portion 130 above outlet port 88. Chamber 114 provides communication between inlet ports 86 and outlet port 88. Water is free to flow through ports 86 and notch 120 into chamber 114 within bore 72. Water is further free to exit chamber 114 through outlet ports 88 into annular passage 76 which, in turn, communicates with nozzle 50 through discharge passage 30, discharge channel 28 and conduit 48.

Notch 120 in cylindrical inlet control piston portion 110 is sized to communicate simultaneously with the fluid inlet ports 86 associated with both the hot and cold water inlet conduits 32. The valve member 100 is rotatable between extreme positions to permit communication of notch 110 with only the hot water or only the cold water. It also may be selectively positioned intermediate the extreme positions to provide any blend of water temperature desired.

Electrically operated, automatic actuation mechanism in the form of electrical solenoid 140 is positioned within upper cylindrical cavity 45 of the middle section 40 of faucet body 10. The solenoid includes an annular coil assembly 142, a surrounding metal jacket 144 and an axially elongated, reciprocal metal armature 156. The coil assembly 142 defines a central bore 148 which receives armature 156. Bore 148 defines a frusto-conical stop surface 154 which limits upward movement of armature 156.

A threaded base 146 of solenoid 140 is secured in threaded bore 24 of housing section 12. By this connection, upper flange 82 of sleeve 72 of flow control and mixing valve mechanism 70 is retained in position within bore 18 of housing section 12. Additionally, an annular, inwardly directed flange formed on jacket 144 is urged upon the shoulder within cavity 45 of middle section 40 of faucet body 10. The middle section 40 is, in turn, urged against shoulder 16 of housing section 12. Threaded upper open end of metal jacket 144 receives and retains threaded portion 66 of top section 60 to complete the faucet body 10.

Armature 156 of the automatic actuation mechanism is attached to stem portion 102 of valve member 100 by a pin 158 which extends through armature 156 and the hole 104 formed in stem 102. In this manner, armature 156 and valve member 100 are fixed for axial and rotational movement.

Armature 156 includes a frusto-conical stop surface 160 which cooperates with stop surface 154 of bore 148 to limit upward axial movement of armature 156. The armature 156 includes upper extension 157 which extends through hole 62 in wall 63 of top section 60. The upper end of extension 157 includes a removable screw which defines an enlarged flange 162. An axially extending keyslot 164 is formed in the upper extension 157 of armature 156.

The automatic actuation mechanism is controlled by electric circuitry which supplies power to solenoid 140 in response to the presence of a user. Electronic circuitry 199 is located on the underside of spout 42. It includes an infra-red emitter 200 and an infra-red detector 202. Signals emitted from emitter 200 are reflected by a stimulus such as the hands of the user and are received by detector 202. The circuitry 199 is responsive to energize solenoid 140. Use of emitting and detecting means mounted on a faucet or remote from the faucet to detect a user's presence and energize a solenoid in response is well known. A suitable circuit arrangement is shown in U.S. Pat. No. 4,914,833.

Energization of solenoid 140 causes armature 156 to move from the position shown in FIG. 1 to the position shown in FIG. 4. Conical stop surface 160 of armature 156 abuts conical stop surface 154 of bore 148 of solenoid assembly 142. Such movement carries valve member 100 to its open position. Notch 120 is placed in communication with inlet ports 86 which permits water to enter annular chamber 114. Edge 105 of outlet closure portion 130 is positioned above outlet port 88. Water entering chamber 114 passes through port 88 to nozzle 50.

Movement of armature 156 in response to energization of solenoid 140 compresses helical coil spring 136 between annular seat 103 on outlet closure portion 130 and the underside of flange 82 of sleeve 72. The compressed spring provides a restoring force which moves valve member 100 to the closed position on deenergization of the solenoid.

The manual actuation mechanism takes the form of operating lever 180. It includes handle portion 182, integral cylindrical portion 186 and removable cap 184. A pin 188 is affixed to cylindrical portion 186. A transverse edge 189 is disposed in semi-circular groove 64 in top section 60 of body 10 and permits lever 180 to oscillate about the vertical axis of the faucet and also pivot vertically.

Spaced depending arms 192 integral with cylindrical portion 186 form a yoke or shackle 190. Arm 192 includes aligned transverse holes, one of which is threaded. As best seen in FIG. 3 the arms 192 define facing surfaces 193.

Cap 184 is a decorative piece and snaps into an appropriately formed opening in the cylindrical portion 186. It is removable to permit access to the internal elements of the faucet.

Collar 170 surrounds the upper extension 157 of armature 156. It defines a key 172 best seen in FIG. 3 disposed in keyslot 164 to fix collar 170 to extension 157 yet permit relative axial reciprocation of armature 156.

Web 174 extends transversely from collar 170. It is secured between arms 192 of yoke 190 and includes a hole 176 aligned with the holes in the yoke arms. Web 174 defines outer faces or surfaces positioned in sliding frictional contact with facing surfaces 193 of depending arms 192 to form a clutch mechanism necessary to manual actuation mechanism. Screw 196 passes through the hole in one arm 192 and is threaded into the threaded hole of the other arm. It passes through hole 176 in web 174 of collar 170 to secure the yoke and collar for relative pivotal operation. The screw draws the arms 192 toward each other to impart the required frictional engagement between facing surfaces 193 of arms 192 and contacting surfaces of web 174.

Manual operation of the faucet is accomplished with operating lever 180. Vertical pivotal movement controls flow. Oscillation about the vertical axis controls water temperature.

Horizontal rotation of operation lever 180 causes end 189 of pin 188 to slide within groove 64 in top section 60. Collar 170 rotates about the vertical axis and the connection of key 172 with keyslot 164 imparts the movement to extension 157 of armature 156. The pin connection of armature 156 to stem 102 of valve member 100 similarly causes valve member 100 to rotate within sleeve 72. Such rotation orients notch 120 relative to the hot and cold water inlet ports 86 to provide proportional mixing of the separate water supplies. The desired temperature of water which exits nozzle 50 is set by the user in this manner. Appropriate stops are provided which limit rotational movement between communication of notch 120 with only hot or only cold water.

Flow control by manual actuation is accomplished through vertical pivotal movement of operating lever 180. Such movement is accommodated by fulcrum action of transverse edge 189 within semi-circular groove 64. The stem 102 armature 156 and extensional 157 form a lifting linkage operatively associated with collar 170.

Upward movement of handle 182 moves arm 192 of yoke 190 upward. This movement is imparted to web 174 by screw 196 to lift collar 170 off of bottom wall 63 of top section 60. Movement of collar 170 is imparted to upper extension 157 of armature 156 through flange defining screw 162 in the upper end of extension 157. This movement is transferred to stem of valve member 100 by pin 158. The lifting linkage formed is effective to move the valve member 100 toward an open position.

The full open position achieved by manual operation is illustrated in FIG. 2. The notch 120 is in communication with inlet ports 86. Edge 105 of outlet closure portion 130 of valve member 100 is positioned above outlet port 88 permitting full flow to conduit 48. Using the manual actuation mechanism selective axial positioning of valve member 100 between fully closed and fully open positions controls volume of water discharged from nozzle 50. Such intermediate axial positioning exposes more or less of inlet ports 86 to notch 120 and also changes the open area of port 88.

Spring 136 is effective in automatic operation to close flow control and mixing valve 70 upon deenergization of solenoid 140. In manual operation, however, the spring force would cause the valve to close upon release of handle 182 by the user. The interactive frictional engagement of the surfaces 193 of arms 192 with facing surfaces on web 174 is set with screw 196 to exceed the spring bias of spring 136. The sliding faces which move relative to each other when the handle 182 is pivoted vertically act as a clutch mechanism. In the manual mode of operation the clutch mechanism holds the valve member 100 in the position to which it is raised until handle 182 is returned to a lower position. Such downward movement lowers the position of collar 170. Spring 136 is then free to move valve member 100 toward the closed position.

There is, in essence, a lost motion relationship between collar 170 and the lifting linkage formed by upper extension 157, armature 156 and stem 102. The lost motion isolates the manual actuation from the flow control valve during automatic actuation. In manual operation, as best seen in FIG. 2, upward force is imparted to valve member 100 through stem 102 armature 156 and the relationship of collar 170 with enlarged flange 162 of extension 157. In automatic operation (FIG. 4) the magnetic flux field of solenoid 140 causes upward movement of armature 156 until stop surface 160 of armature 156 seats against stop surface 154 in bore 148. Such movement permits upper extension 157 to move relative to key 172 without disturbing collar 170. Valve member 100 is lifted independently of collar 170 and consequently independently of manual actuation mechanism 180. Importantly, no relative movement occurs between the frictional surfaces of the yoke 190 and the web 174 which form the clutch mechanism of the manual actuation mechanism. Therefore, the clutch arrangement does not impede the bias of spring 136 during automatic operation.

Figure 5:
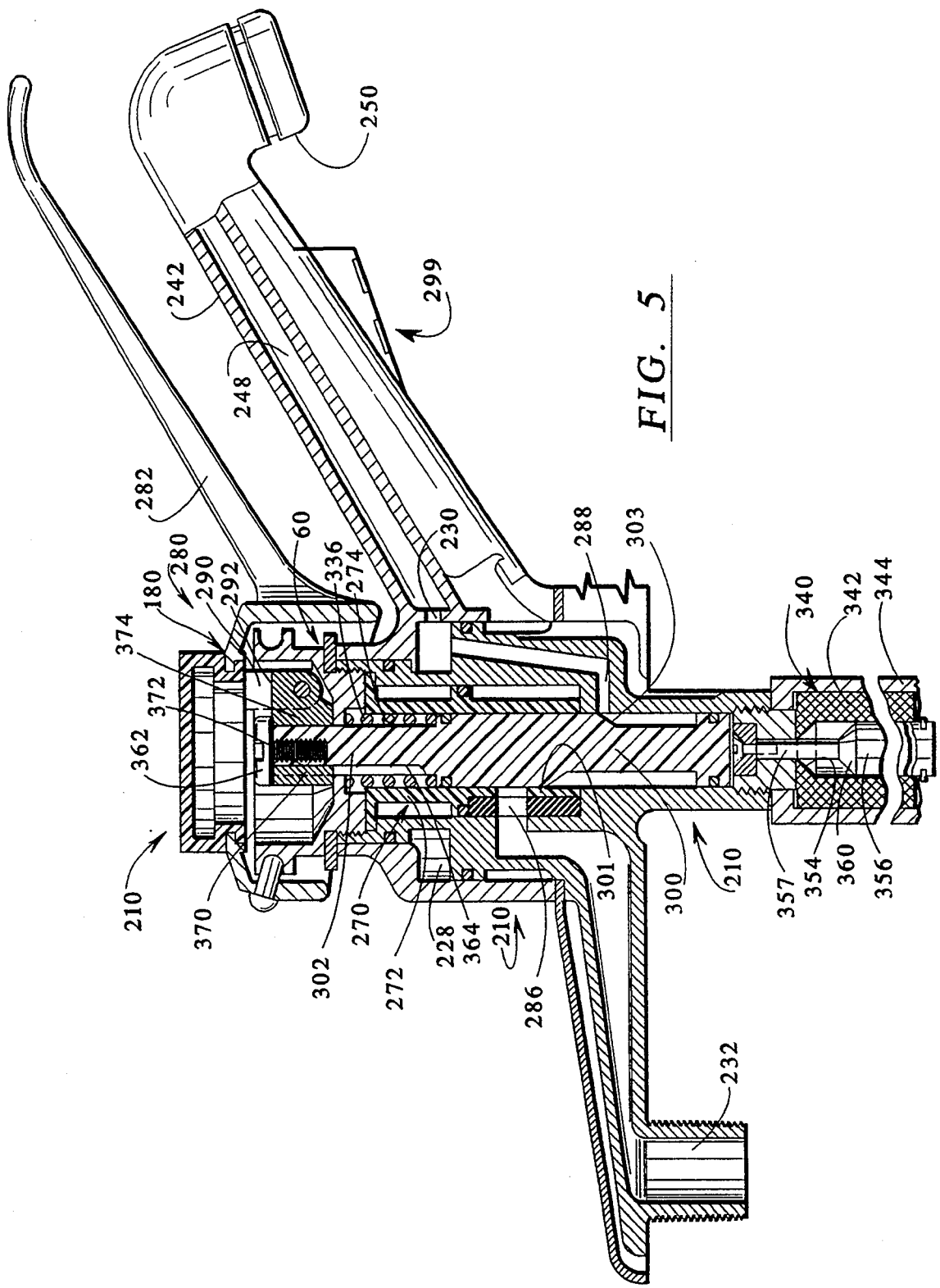
FIG. 5 is a sectional view of an alternate faucet arrangement.

Turning now to FIG. 5 there is illustrated an alternative embodiment of the invention. Faucet body 210 includes hot and cold water inlet conduits 232 and a spout 242 defining an outlet conduit 248 which leads to discharge nozzle 250. Conduit 248 is in communication with discharge passage 230 and channel 228 within body 210.

A flow control and mixing valve or cartridge 270 is supported within body 210. It includes a fixed sleeve 272 which defines a cylindrical bore 274 in which is positioned a rotatable and reciprocal cylindrical valve member 300.

Inlet ports 286 in sleeve 272 communicate the hot and cold water conduits 232 with the bore 274. Outlet port 288 defines a flow path from bore 274 to channel 228.

Valve member 300 defines lands 301 and 303 associated with inlet ports 286 and outlet port 288 to control flow and mixing. In the closed position illustrated in FIG. 5 land 301 closes ports 286 to shut off water flow. Compression coil spring 336 urges valve member 300 to the position illustrated. The valve member 300 is slidable vertically against the bias of the spring to open inlet ports 286 and outlet port 288 to permit flow of water. As in the embodiment of FIGS. 1–4 rotation of valve member 300 controls relative mixing of hot and cold water.

A manual actuation mechanism similar to that of the embodiment of FIGS. 1–4 is provided. Operating lever 280 including handle 282 is supported for pivotal and rotational movement at the upper end of faucet body 210. Operating lever 280 includes depending yoke 290 defined by arms 292 connected to collar 370 which is, in turn, operatively connected to the upper end of stem 302 of valve member 300.

The connection of the yoke 290 and collar 370 and the collar 370 and the stem 302 of valve member 300 are as described with respect to the earlier embodiment and operate in the same manner to permit manual flow and water temperature control. That is, the collar 370 is slidably keyed to the stem 302 by key 372 in slot 364 to affect rotation of valve member 300 for temperature control and also permit vertical movement of stem 302 relative to collar 270.

The end of the stem 302 includes an enlarged flange defined by screw 362. In this embodiment stem 302 defines the lifting linkage connection between valve member 300 and collar 370. Upward movement of collar 370 causes upward movement of stem 302 and valve member 300 to achieve flow. A web 374 on collar 370 defines outer surfaces in frictional engagement with facing inner surfaces of arms 292 of yoke 290. A screw tensions the arms 292 against the web sufficiently to create a clutch mechanism which exerts a holding force to overcome the downward bias of the spring 336. In manual operating mode this clutch arrangement holds the valve member 300 in its set position until the handle 282 and consequently collar 370 are lowered toward the closed position.

Automatic actuation mechanism in the form of electric solenoid 340 is connected to the body 210 below the bottom end of valve member 300. Solenoid 340 includes coil 342 within a metal Jacket 344 and a reciprocal metal armature 356. The solenoid 340 and armature 356 define coacting conical stop surfaces 354 and 360 which limit upward travel of the armature. Armature 356 includes an upper extension 357 which extends into bore 274 of sleeve 272 below valve member 300.

Energization of the automatic actuating mechanism is responsive to electronic sensing circuitry 299 illustrated as mounted on spout 242. Such circuitry including sensing devices could, however, be remote of the faucet. Automatic actuation results from sensing of the presence of the user in a sensing zone which energizes coil 342 of solenoid 340. Armature 356 is caused to move upward until stop surface 360 engages stop 354.

Upon upward movement, extension 357 of armature 356 forces valve member 300 upward to the full Open position. The lands 301 and 303 uncover inlet ports 286 and outlet port 288 and water flows to nozzle 250. On deenergization of solenoid 340 spring 336 causes valve member 300 to return to the closed position.

In automatic actuation, upward movement of valve member 300 is independent of manual actuation mechanism 280. The key 372 and slot 364 connection between stem 302 and collar 370 permit valve member 300 to move vertically relative to collar 370. No movement is imparted to collar 370 and no relative movement between yoke 290 and web 374 occurs. Handle 282 remains still. In this manner automatic actuation is independent of the manual actuation mechanism 280 and its clutch mechanism.

Various features of the present invention have been explained with reference to the embodiments shown and described. It must be understood, however, that modification may be made without departing from the spirit and scope of the invention.

What is claimed is:

1. A faucet for discharging water automatically or manually comprising a body supporting a single flow control valve mechanism said mechanism defining a chamber having at least one inlet port and at least one outlet port, said mechanism including a valve member positionable in a closed position isolating said inlet and outlet ports from said chamber, said valve member movable to open communication of said inlet and outlet ports with said chamber, a manual actuation mechanism external to said chamber, engageable with said valve member of the flow control valve mechanism to move said valve member to open communication of said inlet and outlet ports with said chamber and an electrically operated automatic actuation mechanism external to said chamber engagable with said valve member of the flow control valve mechanism to move said valve member to open communication of said inlet and outlet ports with said chamber independent of the manual actuation mechanism.

2. A faucet as claimed in claim 1 wherein said flow control mechanism includes a sleeve in said body defining said at least one inlet port and said at least one outlet port, said valve member disposed within said sleeve movable between a closed position in which said valve member separates said chamber from said inlet port and said outlet port and at least one open position in which said inlet port and said outlet port are in fluid communication with said chamber, said automatic actuation mechanism being connected to said valve member and operable to move said valve member between said closed position and said at least one open position, said manual actuation mechanism being connected to said valve member and operable to move said valve member from said closed position to said at least one open position.

3. A faucet as claimed in claim 2 wherein said automatic actuation mechanism includes a solenoid mounted on said body, said solenoid including a coil adapted to be energized in response to the presence of a user, a reciprocal armature connected to said valve member and effective to move said valve member to said open position on energization of said coil.

4. A faucet as claimed in claim 3 wherein said faucet includes biasing means operatively connected to said valve member to apply a biasing force to said valve member sufficient to move said valve member to said closed position on deenergization of said solenoid.

5. A faucet as claimed in claim 4 wherein said manual actuation mechanism includes an operating lever, a collar pivotally connected to said operating lever and a lifting linkage operatively connecting said valve member and said collar to move said valve member from said closed position toward said open position, said lifting linkage being arranged such that said valve member is movable relative to said collar during automatic actuation and movable with said collar during manual actuation.

6. A faucet as claimed in claim 5 wherein said collar and said lifting linkage comprise a lost motion linkage to permit said actuation of said faucet by said automatic actuation mechanism independent of said manual actuation mechanism.

7. A faucet as claimed in claim 6 wherein said pivotal connection between said lever and said collar defines a clutch which exerts a force on said valve member which exceeds the force exerted by said biasing means.

8. A faucet as claimed in claim 7 wherein said clutch includes a yoke having two elongated legs on said lever, and said collar surrounds a portion of said lifting linkage and includes a web pivotally connected to said yoke, said legs of said lever being in frictional engagement with said web.

9. A faucet as claimed in claim 8 wherein said coil of said solenoid surrounds said armature and includes an internal stop surface, said armature includes an external stop surface which cooperates with an internal stop surface formed in said coil to limit axial movement of said armature with said valve member in an open position while said solenoid is energized.

10. A faucet as claimed in claim 9 wherein said valve member is rotatable relative to said sleeve to control the temperature of water which exits said outlet port, said manual actuation mechanism being connected to said valve member to rotate said valve member relative to said sleeve.

11. A faucet as claimed in claim 10 wherein said lifting linkage of said manual actuation mechanism defines a keyslot and said collar defines a key engaged with said keyslot to cause said lifting linkage and valve member to rotate with said collar while permitting said relative lost motion to permit actuation by said automatic actuation mechanism independent of said manual actuation mechanism.

12. A faucet as claimed in claim 7 wherein said lifting linkage includes a stem on said valve member connected to said armature, an extension on said armature surrounded by said collar, and an enlarged flange at an end of said extension, such that displacement of said collar causes displacement of said armature.

13. A faucet as claimed in claim 10 wherein said lifting linkage connecting said operating lever and said valve member comprises an extension of said valve member extending through said collar, said extension having an enlarged flange an end, such that displacement of said collar causes displacement of said valve member.

14. A faucet as claimed in claim 3 wherein said automatic actuation mechanism includes a solenoid, said solenoid includes a coil adapted to be energized in response to the presence of a user, and a reciprocal armature engaging said valve member such that energization of said solenoid is effective to move said valve member to said at least one of said open positions.

15. A faucet as claimed in claim 14 wherein said faucet includes biasing means operatively connected to said valve member to apply a biasing force to said valve member sufficient to move said valve member to said closed position on deenergization of said solenoid.

16. A faucet as claimed in claim 15 wherein said manual actuation mechanism includes an operating lever, a collar pivotally connected to said operating lever and a lifting linkage operatively connecting said valve member and said collar to move said valve member from said closed position toward said open position, said lifting linkage being arranged such that said valve member is movable relative to said collar during automatic actuation and movable with said collar during manual actuation.

17. A faucet as claimed in claim 16 wherein said collar and said lifting linkage comprise a lost motion linkage to permit said actuation of said faucet by said automatic actuation mechanism independent of said manual actuation mechanism.

18. A faucet as claimed in claim 17 wherein said pivotal connection between said lever and said collar defines a clutch which exerts a force on said valve member which exceeds the force exerted by said biasing means.

19. A faucet as claimed in claim 18 wherein said clutch includes a yoke having two elongated legs on said lever, and said collar surrounds a portion of said lifting linkage and includes a web pivotally connected to said yoke, said legs of said lever being in frictional engagement with said web.

20. A faucet as claimed in claim 19 wherein said valve member is rotatable relative to said sleeve to control the temperature of water which exits said outlet port, and wherein said lifting linkage of said manual actuation mechanism defines a keyslot and said collar defines a key engaged with said keyslot to cause said lifting linkage and valve member to rotate with said collar while permitting said relative lost motion to permit actuation by said automatic actuation mechanism independent of said manual actuation mechanism.

21. A faucet as claimed in claim 4 wherein said biasing means includes a compression coil spring, said spring engaging said valve member such that said spring is compressed on movement of said valve member to said at least one open position.

22. A faucet as claimed in claim 15 wherein said biasing means includes a compression coil spring, said spring engaging said valve member such that said spring is compressed on movement of said valve member to said at least one open position.

* * * * *